(12) United States Patent
Hinde (10) Patent No.: US 8,132,794 B2
(45) Date of Patent: Mar. 13, 2012

(54) FINE BUBBLE DELIVERY FOR POTABLE WATER, WASTEWATER, AND CLEAN WATER TREATMENT

(75) Inventor: John N. Hinde, Lake Bluff, IL (US)

(73) Assignee: Air Diffusion Systems, Gurnee, IL (US)

( * ) Notice: Subject to any disclaimer, the term of this patent is extended or adjusted under 35 U.S.C. 154(b) by 784 days.

(21) Appl. No.: 12/093,354

(22) PCT Filed: Nov. 28, 2006

(86) PCT No.: PCT/US2006/061295
§ 371 (c)(1),
(2), (4) Date: May 12, 2008

(87) PCT Pub. No.: WO2007/065088
PCT Pub. Date: Jun. 7, 2007

(65) Prior Publication Data
US 2008/0296789 A1    Dec. 4, 2008

Related U.S. Application Data

(60) Provisional application No. 60/740,355, filed on Nov. 29, 2005.

(51) Int. Cl.
*B01F 3/04* (2006.01)
(52) U.S. Cl. .................. 261/105; 261/124; 138/118
(58) Field of Classification Search ............ 261/105, 261/124; 264/132, 146; 138/118
See application file for complete search history.

(56) References Cited

U.S. PATENT DOCUMENTS

| 956,665 A | 5/1910 | Ashley |
|---|---|---|
| 1,950,841 A | 3/1934 | Crawford |
| 2,749,180 A | 6/1956 | Andrews |
| 3,234,123 A | 2/1966 | Hinde |
| 3,293,861 A | 12/1966 | Hinde |

(Continued)

FOREIGN PATENT DOCUMENTS

DE     43 37 091 A1    5/1995

(Continued)

OTHER PUBLICATIONS

Office of Water, United States Environmental Protection Agency, "Wastewater Technology Fact Sheet Fine Bubble Aeration," Sep. 1999, EPA 832-F-99-065.

(Continued)

*Primary Examiner* — Duane Smith
*Assistant Examiner* — Christopher P Jones
(74) *Attorney, Agent, or Firm* — Cook Alex Ltd.

(57) ABSTRACT

A flexible tubing for fine bubble aeration is provided with an air passageway defined in part by an upper portion and a lower portion. The tubing can be made of a uniform weighted material with more material in the lower portion than in the upper portion. This makes the tubing self-orienting, in that it will tend to orient itself with micro-slits along the upper portion facing upward and the lower portion facing downward when submerged in a body of water. An automated, one-stage production line converts raw tubing material to a finished tubing product without the need for separate processing. A method of coiling the tubing places the micro-slits approximately 90° away from the surface of a spool hub, thereby avoiding a longitudinal arch in the tubing and ultimately preventing rollover and improper slit orientation after installation in a water body.

20 Claims, 5 Drawing Sheets

U.S. PATENT DOCUMENTS

| | | | |
|---|---|---|---|
| 3,339,365 A | | 9/1967 | Uden |
| 3,424,443 A | | 1/1969 | Thayer |
| 3,615,078 A | | 10/1971 | Thayer |
| 3,770,623 A | | 11/1973 | Seidel |
| 3,802,676 A | | 4/1974 | Thayer |
| 3,953,553 A | | 4/1976 | Thayer |
| 4,012,470 A | | 3/1977 | Thayer |
| 4,039,439 A | | 8/1977 | Clark |
| 4,060,486 A | * | 11/1977 | Schreiber ............... 210/220 |
| 4,100,073 A | | 7/1978 | Hopcroft |
| 4,126,998 A | * | 11/1978 | Gilead ............... 405/51 |
| 4,165,286 A | * | 8/1979 | Schreiber et al. ............. 210/220 |
| 4,218,318 A | | 8/1980 | Niimi et al. |
| 4,243,521 A | | 1/1981 | Tharp et al. |
| 4,277,341 A | * | 7/1981 | Wise et al. ............... 210/602 |
| 4,288,394 A | | 9/1981 | Ewing et al. |
| 4,382,867 A | | 5/1983 | Schmit et al. |
| 4,488,508 A | | 12/1984 | Heideman |
| 4,563,277 A | | 1/1986 | Tharp |
| 4,599,179 A | | 7/1986 | Pincon |
| 4,889,620 A | | 12/1989 | Schmit et al. |
| 4,960,546 A | | 10/1990 | Tharp |
| 5,013,493 A | | 5/1991 | Tharp |
| 5,032,325 A | | 7/1991 | Tharp |
| 5,059,358 A | | 10/1991 | Tharp |
| 5,133,876 A | | 7/1992 | Tharp |
| 5,234,632 A | * | 8/1993 | Schmidt ............... 261/122.2 |
| 5,328,601 A | | 7/1994 | Schmidt et al. |
| 5,378,355 A | | 1/1995 | Winkler |
| 5,382,363 A | | 1/1995 | Boylen |
| 5,527,454 A | | 6/1996 | Ponte et al. |
| 5,587,114 A | | 12/1996 | Tharp |
| 5,597,491 A | | 1/1997 | Winkler |
| 5,639,364 A | | 6/1997 | Houck et al. |
| 5,660,209 A | | 8/1997 | Franz et al. |
| 5,676,828 A | | 10/1997 | Kallenbach et al. |
| 5,714,062 A | | 2/1998 | Winkler et al. |
| 5,788,847 A | | 8/1998 | Tharp |
| 5,811,164 A | * | 9/1998 | Mitchell ............... 428/36.5 |
| 5,846,412 A | | 12/1998 | Tharp |
| 5,938,983 A | | 8/1999 | Sheaffer et al. |
| 5,989,416 A | | 11/1999 | Gorton |
| 6,086,056 A | | 7/2000 | Leask et al. |
| 6,270,661 B1 | | 8/2001 | Jowett |
| 6,315,493 B2 | | 11/2001 | Malone et al. |
| 6,328,886 B1 | * | 12/2001 | Miyashita et al. ............ 210/220 |
| 6,464,865 B2 | | 10/2002 | Tipton et al. |
| 6,497,402 B2 | | 12/2002 | Tharp |
| 6,511,054 B1 | | 1/2003 | Green |
| 6,540,910 B2 | | 4/2003 | Schwarzenegger et al. |
| 6,543,753 B1 | | 4/2003 | Tharp |
| 6,743,357 B2 | | 6/2004 | Keeton, Jr. |
| 6,749,745 B2 | | 6/2004 | Jowett |
| 6,770,200 B2 | | 8/2004 | Tharp et al. |
| 6,821,424 B1 | | 11/2004 | Branz |
| 6,863,810 B2 | | 3/2005 | Chann |
| 6,929,746 B2 | | 8/2005 | Keeton, Jr. |
| 7,169,295 B2 | * | 1/2007 | Husain et al. ............... 210/150 |
| 2003/0070971 A1 | | 4/2003 | Kim |
| 2005/0151281 A1 | | 7/2005 | Tharp |
| 2006/0011530 A1 | | 1/2006 | Kim |

FOREIGN PATENT DOCUMENTS

| | | |
|---|---|---|
| DE | 198 36 291 A1 | 2/2000 |
| FR | 1 065 060 A | 5/1954 |
| GB | 712084 A | 7/1954 |

OTHER PUBLICATIONS

Yuasa, Eric, "Untitled," circa 2003, Air Diffusion Systems a John Hinde Company.

Air Diffusion Systems a John Hinde Company, "ADS' Product and Application Bulletin," circa 2002, Air Diffusion Systems a John Hinde Company.

Air Diffusion Systems a John Hinde Company, "Stainless Steel Disk Aeration Module," circa 2002, Air Diffusion Systems a John Hinde Company.

International Search Report for PCT Patent Application No. PCT/US2006/061295, dated Jun. 13, 2007.

Office Action from Instituto Mexicano de la Propiedad Industrial for Mexican Patent Appln. No. MX/a/2008/006791, dated Mar. 1, 2011, and partial translation.

Machine translation of DE 19836291 A1.

Machine translation of FR 1065060 A.

Machine translation of DE 4337091 A1.

* cited by examiner

FINE BUBBLE DELIVERY FOR POTABLE WATER, WASTEWATER, AND CLEAN WATER TREATMENT

CROSS REFERENCE TO RELATED APPLICATION

This application claims priority from and the benefit of Provisional Patent Application Ser. No. 60/740,355, filed Nov. 29, 2005, which is hereby incorporated herein by reference.

BACKGROUND OF THE INVENTION

1. Field of the Invention

This invention generally relates to devices for purification and treatment of bodies of water. More particularly, the invention relates to weighted, flexible tubing which is submerged in a body of water for aeration of the water with small bubbles. Special application is found for this approach in natural bodies of water or in wastewater lagoons which are difficult or impractical to drain.

2. Description of Related Art

Aeration of a body of water is beneficial for a number of reasons. For example, it promotes the growth and survival of aerobic micro-organisms, intermediate life forms such as worms and snails, as well as fish and other aquatic wildlife and prevents ice from forming on docks and ships. Perhaps most importantly, aeration is an excellent way to naturally treat wastewater without the introduction of chemicals or the need to remove, haul, and dispose of sludge. In nature, the rolling motion of a river transports oxygen from the water surface to the bottom, which supports riverbed scavengers that digest organic waste and clean the water by converting sludge into carbon dioxide and water. Aeration systems recreate this natural process by providing tubing near the bottom of a body of water and supplying air flow through the tubing. Air slits or orifices in the wall of the tubing or outlet fixtures associated with the tubing allow bubbles to escape into the water, thereby causing the surrounding water to move and circulate in a manner similar to the aforementioned natural rolling motion.

Modern aerators maximize efficiency and performance by providing small bubbles, typically having diameters less than $\frac{1}{8}^{th}$ of an inch (3.175 mm). This is much preferred to using larger bubbles, because larger bubbles rise quickly through the water, decreasing the contact time between air and water, and create turbulent flow, which can lift sediment off of the bottom surface and disperse it throughout the water. In contrast, smaller bubbles rise slowly and create laminar flow, which increases the residence time of the bubbles in the water without stirring up sediment.

Of course, residence time is increased by situating the aerators at the bottom of the water, but care must be taken to properly orient the aerators during installation. Optimal bubble generation is created when the bubbles are released from the uppermost part of the tubing. If the bubbles are instead released from a lower portion of the tubing, then it is possible that they will merge to form larger bubbles, thereby degrading the performance of the aerator. One approach to properly aligning the tubing is to provide fixtures for immobilizing the tubing, such as the system of U.S. Pat. No. 6,511,054, which is hereby incorporated herein by reference. Another approach has been to provide rigid tubing that will not move or rotate after it has been installed. A typical aerator having such a construction can be seen in U.S. Pat. No. 5,714,062, which is hereby incorporated herein by reference.

While these two approaches are effective in properly orienting the tubing, their usefulness is limited for a number of reasons. Aerators using securing fixtures are generally limited to artificial bodies of water having substantially flat bottoms, in order for the tubing to be properly oriented. Also, it is very difficult to service aerators that are affixed to the bottom of the body of water. As for aerators having rigid tubing, they are relatively expensive and, if they are not secured to the bottom of the body of water, then substantial efforts must be taken to ensure that they are submerged at the proper orientation and remain so oriented.

An alternative approach is to provide tubing that orients itself after being submerged. Such an aerator is shown in U.S. Pat. No. 3,293,861, which is hereby incorporated herein by reference. Such an aerator typically includes flexible tubing with a series of micro-slits and a ballast wire diametrically opposing each other along a length of the tubing. The ballast wire causes the tubing to remain submerged, even when filled with air, and automatically places the micro-slits at the uppermost part of the submerged length of tubing.

Such weighted flexible tubing is preferable to the previously described systems, because it is capable of transferring more oxygen per hp-hour and pumping more gallons of water per hp-hour for many aeration operations, such as deep water installations. However, flexible tubing according to the prior art is difficult and expensive to manufacture and often results in a great deal of wasted wire material. Known flexible tubing includes that manufactured according to a multi-stage process, whereby a thin-walled tube is first extruded to define an air passageway. The thin wall makes it difficult to achieve and maintain during manufacture, installation and use, an air passageway with a truly circular cross-section, and any resulting tube that is not substantially tubular or has an overly thin or thick wall can be rejected as defective or perform with reduced efficiency. When the air passageway has been successfully formed, the tube is passed through the extruder a second time, with a ballast wire pressed thereagainst. By this approach, the tube and ballast wire are joined together by the extruder with a film or skin (typically comprised of the same material as the tube) surrounding their outer surfaces.

After the tubing of this type is thus formed, it typically would be sent to another facility or production line to add micro-slits to the air passageway. The wire keel protrusion makes it difficult to properly align the tubing, which can lead to irregularly spaced, sized, and positioned slits. Furthermore, tubing using a lead ballast wire is even more problematic due to the known harm that lead can cause to the environment and those who handle it. In fact, lead-weighted tubing is prohibited by the U.S. Environmental Protection Agency for use in treating bodies of portable water, even if the lead is fully encapsulated by a non-toxic layer.

Another problem with prior art flexible tubing systems is that they generally have a wall thickness no greater than 0.10-0.20 inch (2.54 mm-5.08 mm). Most often, same is in the range of 0.055-0.075 inch (1.397 mm-1.905 mm). This results in nominal orifice pressure drop, causing uneven air distribution and difficulty controlling bubble size. Also, it is difficult to adequately clean such tubing systems, because a cleaning solution injected into the tubing will be released through the initial slits, while little or no solution remains in the tubing to reach and clean the slits at a far end of the tubing. Finally, thin-walled tubing systems are especially prone to kinking, puncturing, collapsing, tearing, cracking, and other performance-inhibiting maladies caused by transport, installation, temperature extremes, high pressure at great submersion depths, abuse by animals, long-term use, and the like.

Yet another possible drawback of using known thin-wall flexible tubing is lifting it from a body of water for inspection or servicing. Known flexible tubing that has become buried in sludge, mud, gravel or debris—for example, as little as 1-3 inches (2.54 cm-7.62 cm) of sludge coverage—is likely to kink, fold, or break when removed by known means and methods, such as a "J" hook or clamping fixture of a boat. Such damage to the tubing degrades the performance of the air-cuts, even if manufactured to provide preferred bubble formation, with a negative result of having the system "boil" air. When this occurs, the treatment suffers and the tubing needs replacing.

Accordingly, a general object or aspect of the present invention is to provide an improved flexible tubing system for fine bubble aeration.

Another object or aspect of this invention is to provide flexible tubing that is self-submerging and self-aligning without the use of a ballast wire.

Another object or aspect of this invention is to provide flexible tubing with improved durability.

Another object or aspect of this invention is to provide an improved method of manufacturing a flexible tube for fine bubble aeration, typically maintaining oil-less fine bubble release in the top area of the tubing as it rests on or near the bottom of a body of water when in use.

Another object or aspect of this invention is to provide a method for coiling and/or storing a flexible tube for fine bubble aeration.

Another object or aspect is to reduce costs for running aeration systems to treat water and wastewater, preferably without using toxic materials such as lead, including during manufacture, installation or long-term use in water systems.

Other aspects, objects and advantages of the present invention, including the various features used in various combinations, will be understood from the following description according to preferred embodiments of the present invention, taken in conjunction with the drawings in which certain specific features are shown.

SUMMARY OF THE INVENTION

In accordance with the present invention, a flexible tubing for fine bubble aeration includes an air passageway defined by an upper portion with a larger profile or a widened profile such as a generally arcuate profile and a lower portion with a generally squared profile. The tubing typically is constructed of a substantially uniform mixture of plastics, polymers or rubber-like compounds and a high-density mineral to overcome buoyancy. For example, the rubber-like material may be highly filled vinyl compounds, PVC, polyethylene, polypropylene, polystyrene, or the like, and the high-density material may be barium sulfate or a similar safe dense mineral. Preferably, the mixture allows different lengths of tubing to be glued or fastened together, while the unique larger, widened or heavier lower portion assures proper alignment of the micro-slits when joining separate lengths of tubing.

The tubing is self-submerging due to the presence of the high-density material and is also self-orienting. There is more material bulk or mass in the lower portion than the upper portion, so the tubing is bottom-heavy and will align itself with the larger, widened or heavier lower portion pointing downward. Micro-slits are placed along the arcuate upper portion, so they will face upward after the tubing has oriented itself in a body of water.

Preferably, the tubing walls are relatively thick, with the upper arcuate portion being at least 0.15 inch (3.81 mm) thick and up to 1.50 inches (3.81 cm) thick. The performance of the micro-slits of the upper arcuate portion is enhanced by the thicker wall, which makes the slits more durable and resistant to deformation due to foreseeable use and abuse. The greater thickness also causes an increased pressure differential, typically a minimum internal pressure drop of 2 PSI, which prevents performance degradation in bodies of water having sloped or inclined bottom surfaces.

A method of manufacturing tubing according to the present invention may be accomplished on a single automated line, which processes the tubing from formation to coiling. A selected mixture of tubing material is added to a hopper, where the mixture is extruded into a tube shape and cured, typically by cooling and drying processes. Micro-slits are added, and the tubing is coiled onto a spool. Additional steps may include a marking process to visually identify an upright position of the tubing.

The slits are preferably precise, surgical cuts in a straight line along the upper portion of the tubing. The slits are formed without removing any material or leaving any burrs, and the generally rubber-like construction of the tubing imparts an elastic wall memory, so the micro-slits will close tightly when there is no air flowing through the tubing. Thus, the cuts act like check valves to protect themselves and the air passageway from the inflow of debris and settled solids. When combined with a thicker wall, the micro-slits perform even better as check valves and will snap shut after airflow is terminated.

The tubing is coiled about a spool such that the micro-slits and squared lower portion are each approximately 90° from the spool hub. Thus, there will be no arch along the length of the tubing, which will remain substantially flat, thereby preventing micro-slit deformation, involuntary roll-over, and other performance degradation. Any lateral curvature in the tubing is minimized by soft tension coiling, which reduces the risk of puckering or other deformation of the slits.

Additional performance and cost benefits of tubing according to the present invention are derived from its simplicity and unique power cost effectiveness. For example, the tubing can biologically convert unwanted wastes in the water into useful biota, carbon dioxide, and pure water with only 1-2% inert ash residual. Also, it is estimated that tubing according to the present invention reduces the costs of operating an associated blower/compressor of systems using this type of tubing to a range of about $0.01 to $0.02 per capita per day for lagoon treatment and to a range of about $0.04 to $0.08 per capita per day for activated sludge treatment.

The streamlined manufacturing and installation processes, along with the reduced operating costs, are estimated to substantially reduce activated sludge treatment costs. For example, for a small-to-medium sized community (500-10,000 people), such costs can be reduced from a $5-$10 per gallon range to a $1-$2 per gallon range. It will be appreciated that cost reductions are also realized during retrieval and inspection operations due to the durable design according to the present invention.

BRIEF DESCRIPTION OF THE DRAWINGS

FIGS. 6-6B illustrate an automated, in-line manufacturing process according to an aspect of the present invention;

FIG. 7A is a side view of a tube wound on a spool in a conventional orientation;

FIG. 7B is a perspective view of the tube of FIG. 7A, in an uncoiled configuration;

DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figures 1A, 1B:
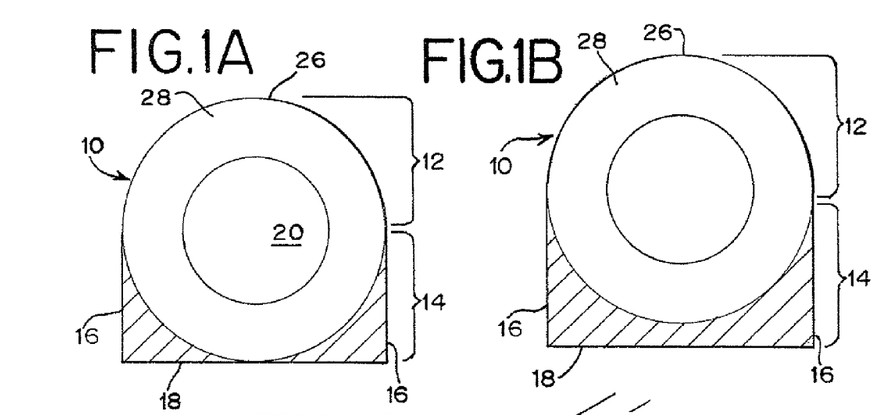
FIG. 1A is a cross-sectional view of a flexible tube according to an aspect of the present invention.
FIG. 1B is a cross-sectional view of another flexible tube according to an aspect of the present invention.

FIGS. 1A-4B show several possible embodiments of a flexible tubing 10 according to respective aspects of the present invention. The flexible tubing 10 has an outer cross-sectional profile defined by a substantially semicircular upper portion 12 and a rectangular or squared lower portion 14 having two flat sidewalls 16 extending downwardly from the arcuate upper portion 12 and a flat bottom wall 18 extending between the sidewalls 16. The illustrated tubing cross-section is referred to herein from time to time as a "D-shaped" profile because it resembles an upper-case "D". When installed, the "D-shaped" profile is rotated 90° counterclockwise. As illustrated in FIGS. 1A-4B, the upper and lower portions 12 and 14 preferably are sized and configured to merge together without any seams or discontinuities. FIGS. 1A and 1C illustrate tubing 10 with upper and lower portions 12 and 14 having the same height, but the heights may be different, as shown in FIG. 1B.

Preferably, the tubing 10 is constructed of a substantially uniform mixture of plastics or rubber-like compounds and a high-density mineral to overcome buoyancy. For example, the rubber-like material may be highly filled vinyl compounds, PVC, polyethylene, polypropylene, polystyrene, or the like, and the high-density material may be barium sulfate or a similar safe heavy compound, material or mineral. In a specific embodiment, the tubing material is a blend of UV-resistant PVC polymers with plasticizers and barium sulfate resulting in a specific gravity of approximately 1.99 SG that ensures the tubing is non-buoyant in a water body. In another embodiment, the lower portion 14 is comprised of a material blend having a greater specific gravity than the upper portion 12 to encourage proper orientation during installation. The mixture of materials makes the tubing flexible, damage-resistant, UV-protected, heat- and cold-protected, and non-toxic. It is estimated that tubing according to the present invention is sufficiently durable to withstand turbulent and/or corrosive water conditions for 20 years without failure or significant performance degradation.

While tubing comprising a blend of a plastics, polymeric or rubber-like material combined with high-density mineral or material as described herein may be preferred, it will be seen from the following description that several aspects of the present invention may be practiced with tubing wholly comprised of a plastics, polymeric or rubber-like material. Of course, if the tubing is so provided, care should be taken to assure that the specific gravity is sufficient to render the tubing non-buoyant in a water body.

Figure 1C:
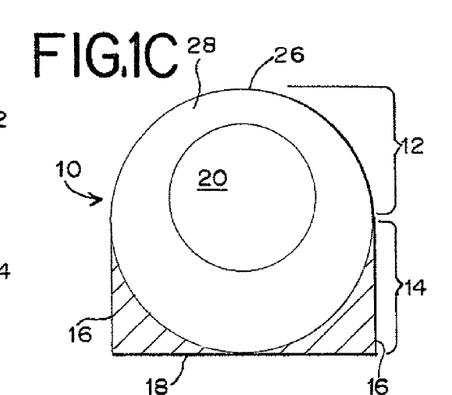
FIG. 1C is a cross-sectional view of yet another flexible tube according to an aspect of the present invention.
Figure 2:
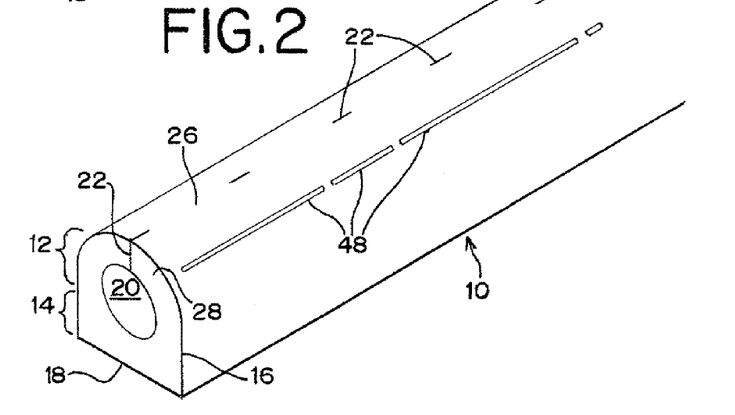
FIG. 2 is a perspective view of a flexible tube according to an aspect of the present invention.
Figure 3:
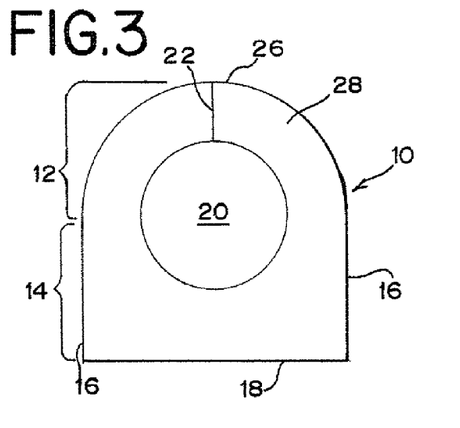
FIG. 3 is a cross-sectional view of a flexible tube according to an aspect of the present invention, with a micro-slit.

The tubing 10 includes an air passageway 20, through which air may be pumped through the tubing 10, typically by operation of blower and/or compressor equipment. As illustrated in FIGS. 1A and 1B, the air passageway 20 is preferably concentric with the arcuate upper portion 12, but it need not be, as shown in FIG. 1C. The portion of the tubing 10 above the center longitudinal axis of the air passageway 20 defines the upper portion 12, while the portion below the center longitudinal axis defines the lower portion 14. An important aspect of the present invention is that there is more material in the lower portion 14 than in the upper portion 12, such that the lower portion 14 is heavier and tends to orient itself under the upper portion 12 when submerged in a body of water. Hence, the air passageway 20 must be properly placed in order for the tubing 10 to remain bottom-heavy, otherwise the self-orienting function will be disrupted.

FIGS. 1A-1C illustrate an uncut profile of the tubing 10. The upper portion 12 includes a plurality of longitudinally spaced micro-slits or slits 22, as shown in FIGS. 2-4B. Preferably, the slits 22 are surgical cuts with smooth faces 24 (FIG. 4A), so no material is removed and there are no burrs or bumps between opposing faces. When air is pumped through the air passageway 20, it will escape through the micro-slits 22, which generally take on the open condition of FIG. 4A, and will be released into the surrounding environment. Optimal aeration performance is achieved by laminar flow of relatively small bubbles, so the slits 22 are placed at an uppermost portion 26 of the tubing 10 and are sized and configured to release bubbles having a diameter between 1/64 inch and 1/8 inch (between about 0.397 mm and 3.175 mm).

Figure 4A:
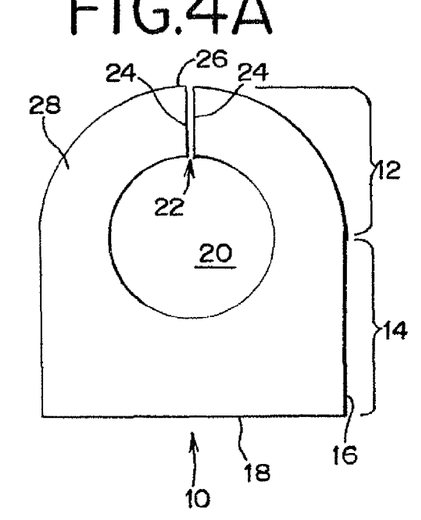
FIG. 4A is a cross-sectional view of a flexible tube according to an aspect of the present invention, with a micro-slit in an open position.
Figure 4B:
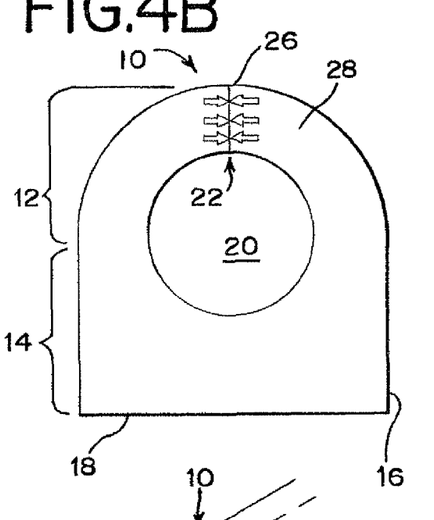
FIG. 4B is a cross-sectional view of the flexible tube of FIG. 4A, with the micro-slit in a closed position.

When no air is being pumped through the tubing 10, the slits 22 take on the closed condition of FIG. 4B, due to the elastic wall memory of the tubing material. The precisely formed slits 22 substantially close to prevent water or waste solids even as small as 0.001 inch (0.0254 mm) in diameter from entering the interior of the tubing 10. This valving function of the slits 22 is enhanced by a relatively thick upper tube wall 28, which is five to ten times thicker than other previous approaches. The tube wall 28 provides a larger wall surface area and causes the slits 22 to close tighter than for a thinner upper tube wall. In a preferred embodiment, the upper tube wall 28 is between 0.20 inch and 0.30 inch (between about 5.08 mm and 7.62 mm) thick for a tube 10 having an air passageway 20 with a 0.50 inch (1.27 cm) diameter. For a tube 10 having a larger air passageway 20, such as 0.75 inch (1.905 cm) or 1.50 inches (3.81 cm), the upper tube wall 26 is preferably between 0.50 inch and 1.50 inches (between about 1.27 cm and 3.81 cm) thick.

By way of further illustration, the pipe dimension ratio or "DR" is a value established by the American Society for Testing and Materials (ASTM) to express the relative wall thickness, and hence the pressure rating, of a pipe or tube. The dimension ratio is equal to the outer diameter divided by the minimum wall thickness of the tubing, and the pressure rating increases as the dimension ratio decreases. For known flexible aeration tubing, the dimension ratio is typically in the range of approximately 10-11. For example, a known flexible aeration tubing has an outer diameter of 0.625 inch and a wall thickness of 0.060 inch, for a DR of 10.4. In contrast, tubing according to the present invention may have a dimension ratio of approximately 5 (for the above example of a tube having an upper wall thickness of approximately 0.50 inch and an air passageway diameter of approximately 1.50 inches, or an outer diameter of 2.50 inches) or less. Another embodiment has an outer diameter of 0.950 inch and a wall thickness of 0.250 inch, for a DR of 3.8.

In addition to enhancing the valving function of the microslits 22, the use of a thicker upper tube wall 28 provides numerous other advantages. For example, the tube 10 is more durable and will resist kinking or tearing or other deformation, which ensures the functioning of the micro-slits 22 as designed. This tubing 10 is stronger, more reliable, and less likely to collapse, crack or damage the air cuts 22. Thicker tube walls 28 also allow the tubing 10 to function in deeper water, e.g., at depths of between 33 feet and 100 feet (between about 10.06 m and 30.48 m), without collapsing. Also, the wall 28 compresses the bubbles before they are released into the surrounding environment.

By this feature, tubing according to the present invention is much more reliable than known tubing in terms of limiting the size of bubbles and preventing the "coning effect." The "coning effect" refers to a situation whereby bubbles larger than ⅛ inch (3.175 mm) slip through the orifices and fail to lift the surrounding water nearly as much as properly sized bubbles. In extreme cases, larger bubbles will lift 4-6 times less water than properly sized bubbles. This is as important as bubble contact time for transfer of oxygen into the water, because it is important to disperse the oxygen equally throughout the water body. Ultimately, this feature reduces the electrical power required for the bubble-formation system to maintain uniform dissolved oxygen all over the water column and not just above the diffuser. Over a 20-year time period, the electrical costs to run the associated blower/compressor usually is the single largest cost of aerating a body of water, so a reduction in power requirements without a reduction in performance is a major benefit.

Furthermore, a relatively large pressure differential is created between the air passageway 20 and the outside environment, which improves fluid dynamics and allows for a more uniform distribution of air and cleaning fluid, especially at a distal end of the tubing 10. Typically, the minimum internal pressure drop at the slits 22 is at least 2 PSI, which allows for a 4.6 foot (about 1.4 m) end-to-end height variation of an installed tube without a loss of air pattern. In one exemplary application, tubing according to the present invention allows for bubble uniformity of plus or minus 5-10% at every orifice for tubing lengths in the range of 250-500 feet (76.2 m-152.4 m), which is difficult or impossible to achieve with known tubing technology. Thus, the fluid dynamic properties of air flowing through thick-walled slits offers better control of the internal and external pressure differential and better control of uniform fine bubble release across long distances and non-level bottom diffusion areas. Thick-walled tubing also avoids the need to follow so-called soft-tension coiling or loose coiling of thin walled tubing often required to prevent puckering of the air-cuts.

Figures 5A, 5B:
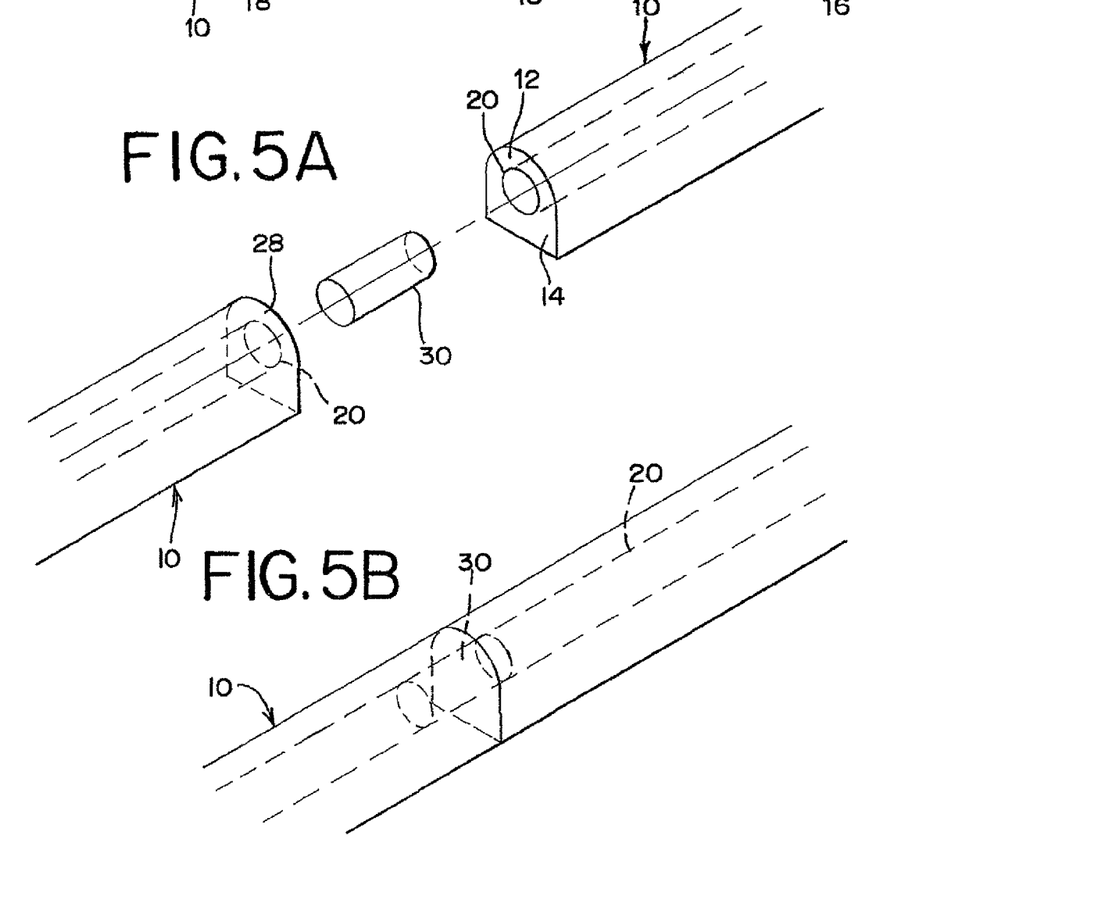
FIG. 5A is a perspective view of two tubes and a tube insert connector.
FIG. 5B is a perspective view of the two tubes of FIG. 5A, joined by the tube insert connector.

Lengths of tubing 10 according to the present invention may be joined by an adhesive or glue, as illustrated in FIGS. 5A and 5B, and the thicker tube walls 28 provide more surface area on which to apply the adhesive. Furthermore, the widened or heavier lower portion 14 allows the lengths of tubing 10 to be easily aligned, which ensures that the micro-slits (not illustrated) remain at the uppermost portion of the tubing 10. Preferably, this lower portion 14 has a squared profile, as illustrated. In addition to adhesive, the tubing sections 10 are preferably joined using a tube insert connector 30, which aids in aligning the sections 10 and decreases the risk of leakage. It will be seen that flexible tubing according to the present invention is preferred to tubing having a ballast wire, because it can be cut and joined to another length of tubing or a feeder without having to trim the wire or any excess skin coating and does not require special tools, clamps, or skill. For the same reason, the tubing can be easily cut to the desired length during manufacture, which eliminates waste.

In addition to joining separate lengths of tubing, adhesive may also be used to repair a rupture or tear in the tubing. Known flexible tubing is typically comprised of polyethylene, which must be repaired by special heat fusion or splicing tools. In contrast, tubing according to the present invention made of, for example, PVC may be repaired by drying the damaged area, priming any damaged air-cuts with primer, applying adhesive to the area, and allowing the adhesive to set. Thus, tubing according to the present invention may be repaired by non-specialists using easily-accessible materials.

Figures 6, 6A, 6B, 7A, 7B:
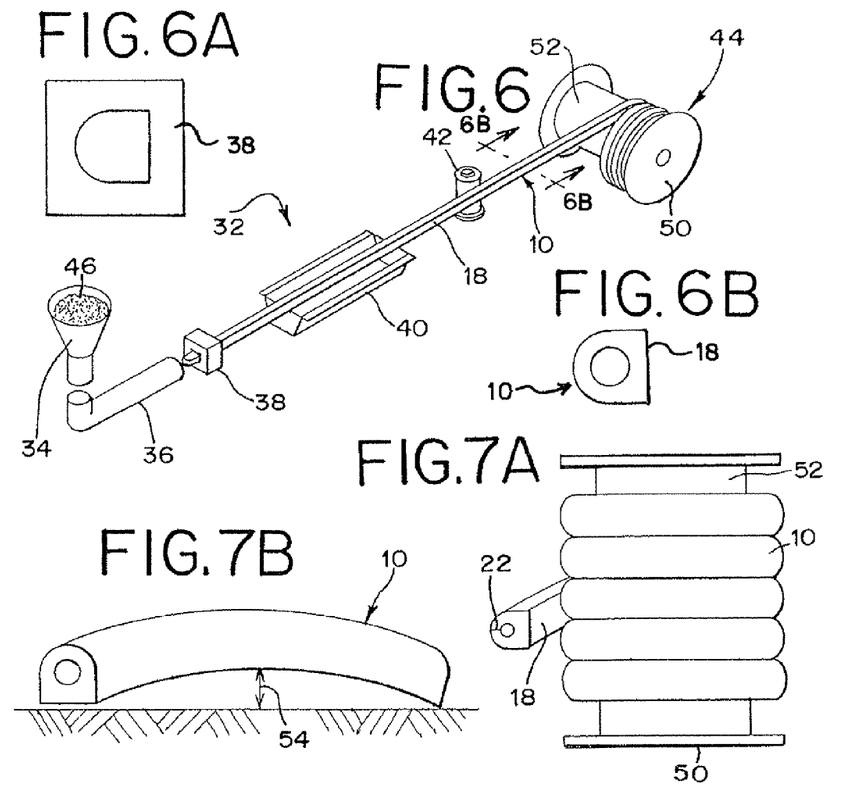

Tubing according to the present invention may be manufactured using known methods. A suitable and usually preferred manufacture by an automated, one-stage production line 32 according to another aspect of the present invention is illustrated in FIG. 6.

The production line 32 includes a hopper 34, a heated barrel 36, an extrusion die 38, a curing vessel 40, a cutting unit 42, and a coiling station 44. As can be seen, the tubing goes from raw material 46 to a coiled finished product 10 in one stage, thereby greatly reducing manufacturing time, manpower, cost, and waste over the processes used to manufacture tubing with a ballast wire. Stocking of only four basic diffusion tubes satisfies needs for most water treatment applications, thereby simplifying inventory control and reducing costs.

The first step of this illustrated approach is to place a mixture of raw tubing material 46 into the hopper 34. The tubing material 46 can be stored in pellet form and added in different percentages, depending on the intended use of the tubing. For example, there may be different pre-mixes for wastewater treatment installations, as opposed to lake and reservoir, fish farming and aquaculture, and ice melting installations. Special mixes can be made to order as well, depending on the unique needs of each body of water. It will be appreciated that tubing according to the present invention requires less storage space, because the raw materials can be completely stored in pellet form and no separate space is required for coils of ballast wire.

After the desired mixture 46 has been added to the hopper 34, the pellets are fed through a heated barrel 36 and forced through an extrusion die-block 38 having a profile or opening corresponding generally to the "D-shaped" profiles of FIGS. 1A-1C. Of course, the opening of the die 38 will have a different shape, corresponding for example to the tube profile shown in FIG. 9F, if the cross-sectional profile of the tubing varies from the profiles of FIGS. 1A-1C. As illustrated in FIG. 6A, the opening of the die-block 38 is rotated 90° with respect to the orientation of FIGS. 1A-1C. This orientation is important for properly winding the tubing, as will be described herein.

The tubing material forced through the die-block 38 is then fed through a curing vessel 40, where it is cooled and solidified. When the material has been sufficiently cured, it is passed through a cutting unit 42. As shown in FIG. 6, the cutting unit 42 is aligned with the die-block 38, such that slits are made in the uppermost part of the arcuate portion of the tube, opposite the flat or widened bottom wall (as in FIGS. 2-4B). In accordance with the foregoing description, the cutting unit 42 preferably creates surgical cuts in a straight line along the upper portion 12 of the tubing 10 without removing any tubing material or leaving any burrs. As opposed to prior art tubes, with ballast wire protrusions that track poorly, the flat walls of the tubing according to the present invention allow for better tracking and are easily aligned for accurate slit placement. It is estimated that the amount of defective tubing produced by the method of FIG. 6 can be reduced from approximately 25% (for thin-walled flexible tubing with a ballast wire) to approximately 2-4% or less.

The cutting unit may include an ink-marking step before the slits are added to the tubing. The ink-marking step adds registration marks 48 to the arcuate portion 12 of the tubing 10 (FIG. 2), which are useful as additional visual indicators of the orientation of the upper portion 12 of the tubing 10.

Figure 8A:
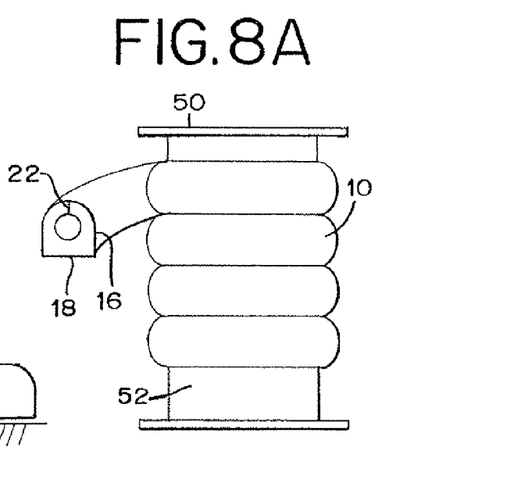
FIG. 8A is a side view of a tube properly wound on a spool according to an aspect of the present invention.
Figure 8B:
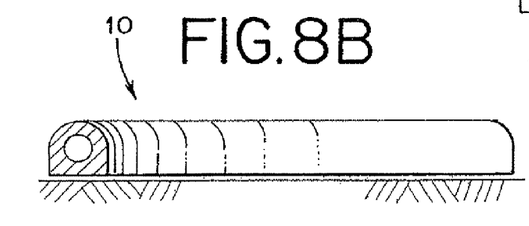
FIG. 8B is a perspective view of the tube of FIG. 8A, in an uncoiled configuration.

After the micro-slits have been added to the tubing 10, the tubing 10 is fed to a coiling station 44. The coiling station 44, in the orientation shown in FIG. 6, has a horizontally-oriented spool 50 with a cylindrical hub 52. The tubing 10 is wound around the hub 52 for storage and transport. According to an aspect of the present invention, the flat or widened bottom wall 18 and the micro-slits 22 are disposed approximately 90° away from the hub 52, as illustrated in FIGS. 6B and 8A. As the tubing 10 is continuously wound about the hub 52, it remains in the proper orientation, due to the tubing 10 being formed and wound as part of a one-stage process. This orientation is important to ensure that the tubing 10 remains longitudinally flat after installation as shown in FIG. 8B. Any lateral curvature in the tubing is minimized by soft tension coiling, which reduces the risk of puckering or other deformation of the slits.

Figure 7C:
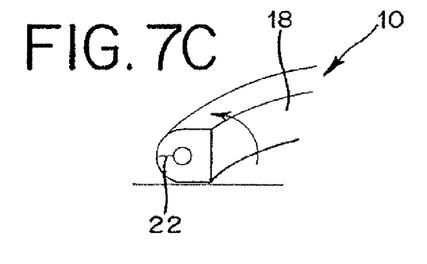
FIG. 7C is a perspective view of the tube of FIG. 7B in a roll-over condition.

If the tubing 10 is instead wound such that the flat or widened bottom wall 18 is adjacent to the hub 52, as in FIG. 7A, then the coil memory of the tubing 10 will result in a longitudinal arch 54, which is shown in FIG. 7B. An arch 54 makes the tubing 10 unstable and may cause it to roll over when uncoiled (FIG. 7C), which moves the micro-slits 22 away from their optimal position and degrades the aeration capabilities of the tube 10.

Figures 9A, 9B, 9C, 9D:
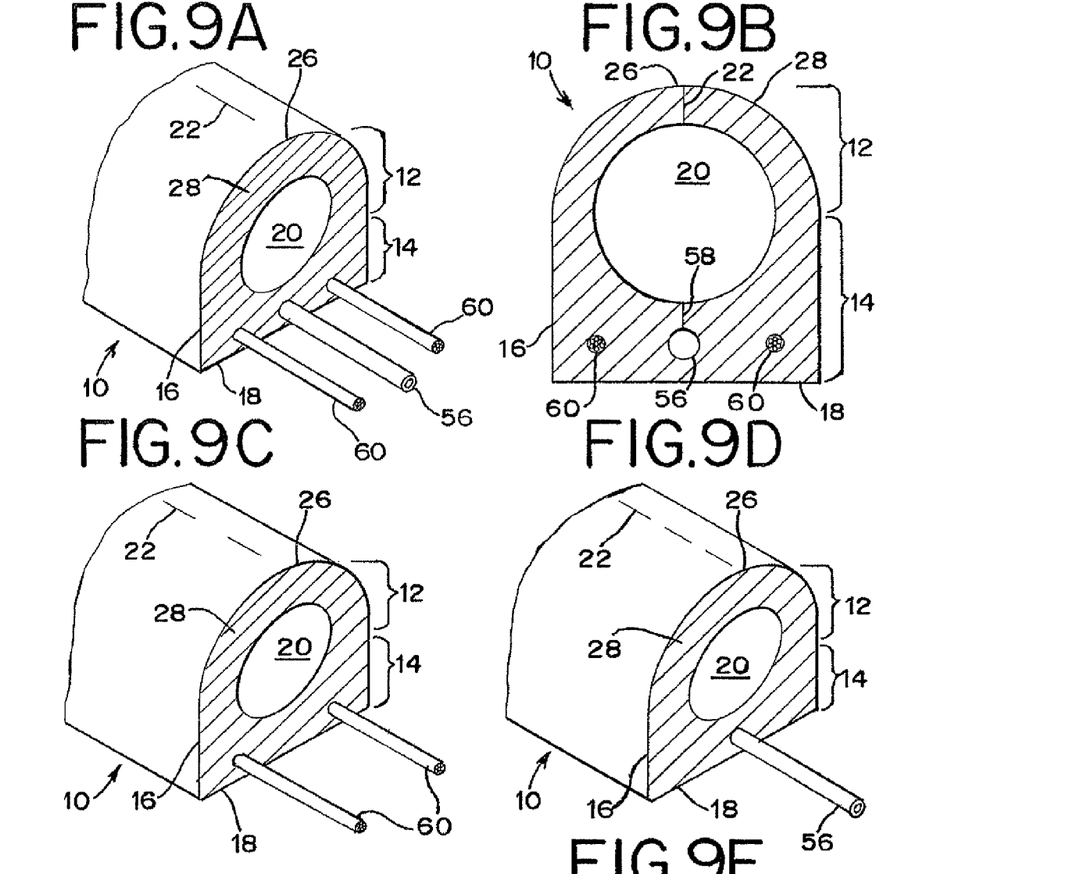
FIG. 9A is a perspective view of a tube having a secondary lumen and a pair of tethers.
FIG. 9B is a cross-sectional view of another embodiment of a tube having a secondary lumen and a pair of tethers.
FIG. 9C is a perspective view of an embodiment of a tube having a pair of tethers.
FIG. 9D is a perspective view of an embodiment of a tube having a secondary lumen.

Additional features and components may be incorporated into the tubing without departing from the scope of the present invention. For example, a secondary lumen or passageway 56 may be formed in the lower portion 14, preferably directly below the air passageway 20 (FIGS. 9A, 9B, and 9D). As shown, the secondary lumen 56 may be substantially smaller than the air passageway 20. The secondary lumen 56 may be provided as a tubular member embedded in the lower portion 14 (FIGS. 9A and 9D) or as a hollow lumen (FIG. 9B), similar to the air passageway 20. The secondary lumen 56 may be incorporated into the tubing 10 by any of a number of methods, depending on the structure. If the secondary lumen 56 is provided as a tubular member, it is preferably extruded into the bottom portion 14 during the method illustrated in FIG. 6. Suitable materials for a tubular member include, but are not limited to highly filled vinyl materials, such as those used as tubing material according to an aspect of the present invention.

In one embodiment, the secondary lumen 56 runs the length of the tubing 10 and has a diameter in the range of approximately $\frac{1}{32}$-$\frac{1}{20}$ inch (about 0.794 mm-1.27 mm) to allow air, gasses, and/or liquids to pass therethrough. The secondary lumen 56 may be used for any of a number of applications, such as carrying a fluid, for example air or another gas, to inflate a submerged flotation device (not illustrated) for retrieval of the tubing 10. In such an application, it is preferred for the secondary lumen 56 to be sealed from the air passageway 20 and the outside environment, as in FIG. 9A. For such an application, it may be preferred for the secondary lumen 56 to be provided as a tubular member, with a portion thereof extending beyond the proximal and/or distal ends of the tubing to simplify fixation to the flotation device.

The tubing 10 of FIG. 9A may also be used in delivering nitrogen- and/or sludge-combating bacteria to the water column and/or sludge layer. By known methods, such bacteria are delivered to one or more of the surface of the water body, the water column, and the sludge, typically from a boat- or shore-based applicator. Hence, it will be seen that this aspect of the present invention advantageously allows the bacteria to be easily dispersed with a tube that has already been installed for aeration purposes.

In another application, the secondary lumen 56 includes a plurality of orifices 58 (FIG. 9B) at selected locations along the length of the tubing 10 to allow for communication with the air passageway 20. The orifices 58 may be provided in a number of configurations, such as micro-slits or micro-fittings, and are preferably movable between a closed condition, preventing communication between the secondary lumen and the air passageway, and an open condition, allowing communication therebetween. A cleaning or treatment fluid is passed through the secondary lumen 56 and released through the orifices 58 to clean or treat the air passageway 20 and air-cut slits 22. The orifices 58 of the secondary lumen 56 may have a higher cracking pressure than the air-cut slits 22 to prevent the orifices 58 from opening during aeration of a water body.

Figure 9E:
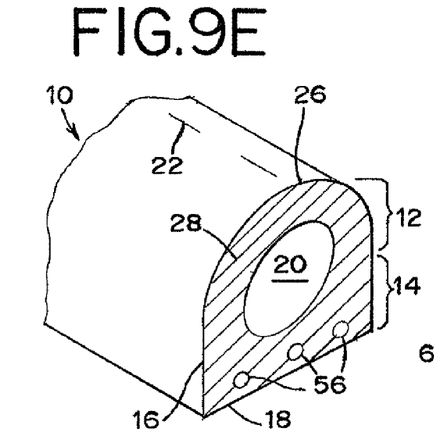
FIG. 9E is a perspective view of an embodiment of a tube having a plurality of secondary lumens.
Figure 9F:
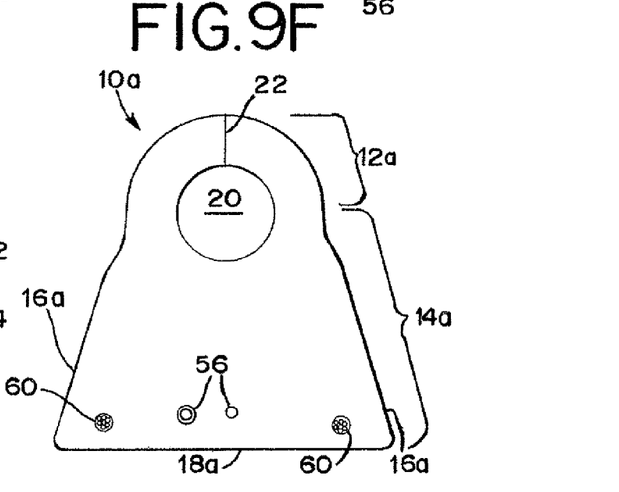
FIG. 9F is a cross-sectional view of an embodiment of a tube having a "modified D-shaped" profile and a plurality of secondary lumens and tethers.

The tubing 10 may also be provided with a plurality of secondary lumens 56, as shown in FIGS. 9E and 9F. The secondary lumens 56 may provided as either hollow tubular members, hollow lumens (FIG. 9E), or as a combination thereof (FIG. 9F). Also, the secondary lumens 56 may be separate from each other along their lengths or may be joined at various locations by hollow or valved branches (not illustrated). The secondary lumens 56 may be used for different purposes, for example, one may be used for inflating a submerged flotation device, another may be used for applying a cleaning fluid to the air passageway 20, and yet another may be used for delivering nitrogen- and/or sludge-combating bacteria to a target site.

FIGS. 9A and 9B also illustrate the tubing 10 with a pair of identical tethers or harness cables 60 embedded in the lower portion 14. Alternatively, the secondary lumen 56 and tethers 60 may be practiced separately, as in FIGS. 9C and 9D, and the tubing 10 may be provided with a single tether, more than two tethers, or non-identical tethers. The tethers 60 preferably run at least the length of the tubing 10 and, more preferably, extend beyond the proximal and distal ends thereof. Alternatively, each illustrated tether 60 may be provided as two or more tether segments (not illustrated) axially aligned with each other and spaced along the length of the tubing or press-fit into cavities formed at the ends of the tubing (not illustrated). The tethers 60 may be incorporated into the tubing 10 by any of a number of methods, but are preferably extruded into the bottom portion 14 during the method illustrated in FIG. 6.

The tethers 60 are preferably comprised of a non-toxic, non-corrosive material that is stronger than the tubing material, such as stainless steel, and may have a diameter of approximately 0.0625 inch (1.5875 mm) for example. Other tether materials may also be used without departing from the scope of the present invention. If the tether material has a greater specific gravity than the tubing material, the tethers 60 will assist the lower portion 14 in properly orienting the tubing 10 within a water body. Accordingly, it may be preferred for the tethers 60 to be symmetrically arranged with respect to the width of the tubing 10, as illustrated in FIGS. 9A and 9B, to ensure that the tubing 10 is installed with the micro-slits 22 facing upwardly.

The tethers 60 may be used for any of a number of applications, such as to secure the tubing 10 to a submerged anchor (such as a post with an eye-bolt) and prevent movement thereof under strong underwater flow or currents such as mechanical pumping operations, strong river currents or "washout" rain falls. The tethers 60 may also be gripped to reel in the tubing 10 for inspection or servicing. In one embodiment, the tethers 60 extend between one and four inches (between about 2.54 cm and 10.16 cm) beyond the ends of the tubing 10, but they may extend to a greater or lesser extent without departing from the scope of the present invention.

The use of secondary lumens and/or tethers may decrease the weight and/or effective specific gravity of the lower portion, so it may be preferred to provide tubing having a modified lower portion to ensure that the submerged tubing will properly orient itself. For example, FIG. 9F illustrates tubing 10a having a "modified D-shaped" cross-sectional profile, wherein the sidewalls 16a extend downwardly and laterally outward from the upper portion 12a to a bottom wall 18a that is wider than a width or outer diameter of the upper portion 12a. In comparison to the "D-shaped" profiles illustrated in FIGS. 1A-4B, the bottom portion 14a of FIG. 9F has a greater height, which increases the weight of the bottom portion 14a. When desired, this greater weight can be chosen so as to overcome any buoyancy that may be added by the secondary lumens 56 and/or tethers 60.

A "modified D-shaped" profile may also be practiced without secondary lumens or tethers and with a bottom portion height comparable to the bottom portion heights illustrated generally in FIGS. 1A-4B. In particular, tubing having a relatively wide bottom wall will have even less tendency to tip over and become disoriented in turbulent water conditions. Weight added by a more substantial bottom portion also can maintain the tubing in an upright orientation, such as illustrated in FIG. 9F, or the added weight can combine with the relatively wide bottom to facilitate proper upright orientation.

Therefore, it may be preferred to provide flexible tubing having a bottom wall at least approximately 50% wider than the width or outer diameter of the upper portion. In another embodiment, the tube has a "modified D-shaped" profile with a bottom wall approximately twice as wide as the width or outer diameter of the upper portion. Other embodiments have a bottom wall width suitable for the particular needs of the system, such as between about 150% and 200% and above of the upper portion width or diameter.

It will be appreciated that the secondary lumen and/or tethers may be initially manufactured to extend beyond the ends of the tubing or may instead be coextensive or somewhat shorter than the tubing, in which case the ends of the tubing may be trimmed or cut away to expose a portion of the secondary lumen and/or tethers. Therefore, the terms "proximal end" and "distal end," when referring to a tubing according to the embodiment of FIG. 9, are used broadly to refer to either the structure of the tubing as manufactured or as submerged in a body of water. Additionally, it will also be appreciated that secondary lumens and tethers according to this aspect of the present invention may be incorporated into known flexible tubing, although it may be preferred to use them in combination with tubing according to the present invention.

Figures 10A, 10B, 10C:
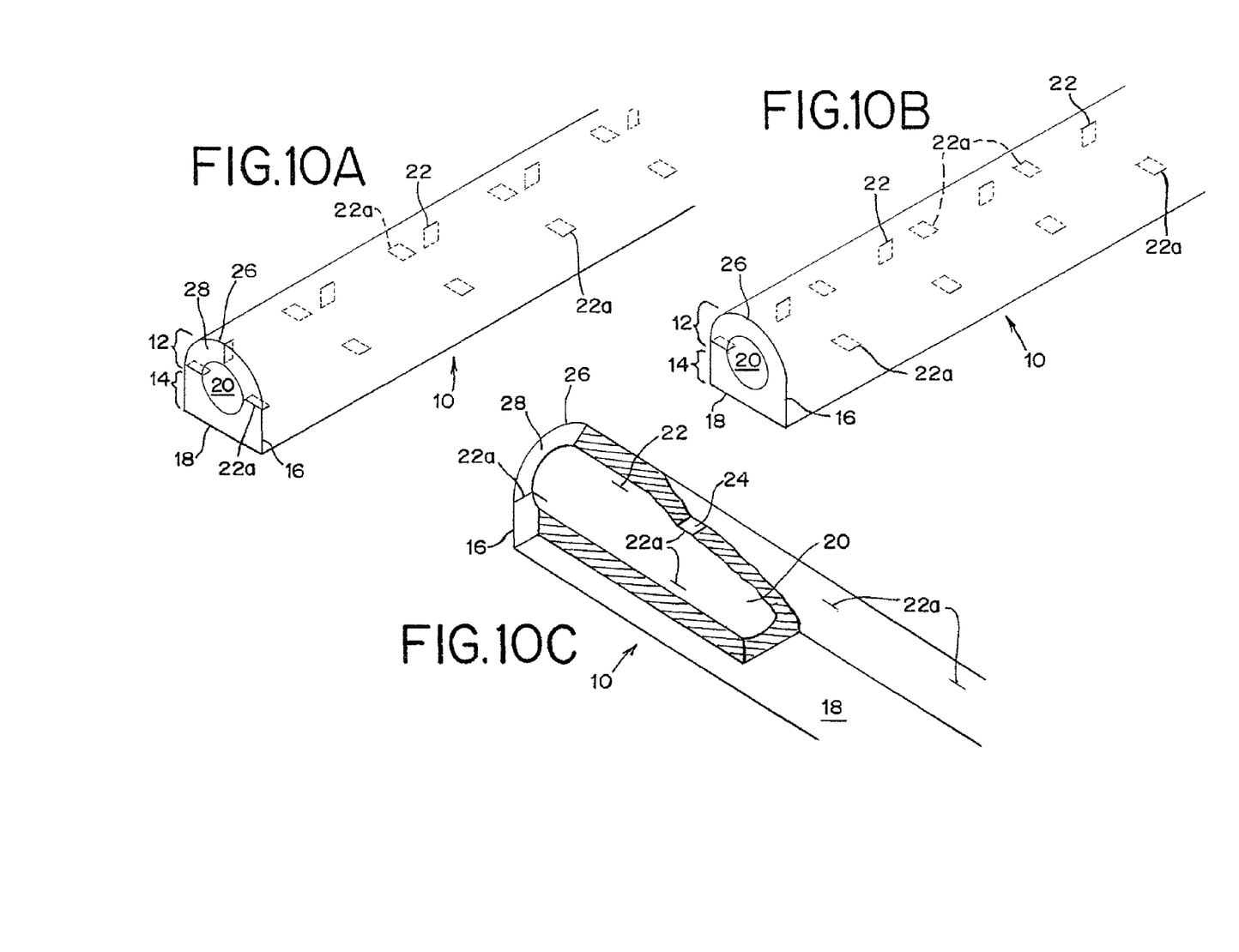
FIG. 10A is a perspective view of a tube according to an embodiment of the present invention having an alternative air-cut slit arrangement.
FIG. 10B is a perspective view of a tube according to the present invention having yet another alternative air-cut slit arrangement.
FIG. 10C is a bottom perspective view of the tube of FIG. 10B, with selected portions broken away.

Finally, FIGS. 10A-10C illustrate additional embodiments of tubing 10 according to the present invention. The tubing 10 of FIGS. 10A-10C includes micro-slits 22 arranged in a line along the uppermost portion 26, as well as micro-slits 22a formed at locations of the upper portion 12 angularly spaced from the uppermost portion 26. In FIG. 10A, all of the micro-slits 22, 22a are formed in the same plane, whereas the micro-slits 22, 22a are staggered along the length of the tubing 10 of FIGS. 10B-10C. As illustrated, it may be preferred for the micro-slits 22, 22a to be equally spaced from each other along the length of the tubing 10, but the spacing may vary without departing from the scope of the present invention. While many applications may be best served by micro-slits aligned along the uppermost portion 26 of the tubing 10, other applications may benefit from micro-slits aligned along a line angularly spaced from the uppermost portion 26 or micro-slits arranged at varying angular positions along the length of the tubing 10. Hence tubing according to the present invention is not limited to a specific micro-slit placement, orientation, or arrangement.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein.

The invention claimed is:

1. A flexible tubing for fine bubble aeration, comprising an air passageway, wherein the air passageway is defined by an upper portion and a lower portion, the upper portion is of a given cross-sectional area and is comprised entirely of a first material and includes a plurality of micro-slits communicating with the air passageway and the outside environment, the lower portion is of a selected cross-sectional area and is comprised entirely of a second material, and said given cross-sectional area of the upper portion is smaller than said selected cross-sectional area of the lower portion; wherein said lower portion has a cross-sectional shape with generally flat sidewalls and a generally flat bottom wall extending between the sidewalls.

2. The flexible tubing of claim 1, wherein the upper portion defines an arcuate cross-sectional shape and the tubing has a generally "D-shaped" cross-sectional profile.

3. The flexible tubing of claim 1, wherein the lower portion has a bottom wall, and said bottom wall has a lateral width greater than the lateral width of the upper portion.

4. The flexible tubing of claim 3, wherein the bottom wall has a lateral width at least 50% wider than the upper portion.

5. The flexible tubing of claim 1, wherein said first material and said second material are the same material.

6. The flexible tubing of claim 5, wherein said first material and said second material are selected from the group consisting of a plastic, a polymer, a rubber-like compound, and a high-density material combined with a plastic, polymer or rubber-like compound.

7. The flexible tubing of claim 1, wherein said second material comprises a blend of a high-density mineral and a material selected from the group consisting of a plastic, a polymer, and a rubber-like compound.

8. The flexible tubing of claim 7, wherein said first and second material comprises a blend of a polyvinyl chloride polymer and barium sulfate.

9. The flexible tubing of claim 1, wherein the tubing has a pipe dimension ratio (DR) no greater than approximately 5.

10. The flexible tubing of claim 1, further comprising a substantially hollow secondary lumen within the lower portion and adapted for passing a fluid, gas or combination thereof therethrough when the tubing is submerged in a body of water.

11. The flexible tubing of claim 1, further comprising a plurality of tethers embedded in the lower portion, extending beyond at least one of the proximal and distal ends of the tubing, and adapted for securing the tubing when submerged in a body of water.

12. A flexible tubing for fine bubble aeration, comprising:
an upper portion and a lower portion generally defining the tubing, the tubing having a proximal end and a distal end;
an air passageway defined by the upper portion and the lower portion;
a plurality of micro-slits through the upper portion and communicating with the air passageway and the outside environment; and
a substantially hollow secondary lumen defined by the lower portion, adapted for passing a fluid therethrough when the tubing is submerged in a body of water, extending from the proximal end to the distal end, and isolated from the body of water.

13. The flexible tubing of claim 12, wherein said secondary lumen comprises a tubular member extending beyond at least one of the proximal end and the distal end of the tubing.

14. The flexible tubing of claim 12, further comprising a plurality of orifices communicating with the secondary lumen and the air passageway and movable between a closed condition to prevent communication between the secondary lumen and the air passageway and an open condition to allow communication between the secondary lumen and the air passageway.

15. The flexible tubing of claim 12, further comprising a plurality of tethers embedded in the lower portion, extending beyond at least one of the proximal and distal ends of the tubing, and adapted for securing the tubing when submerged in a body of water.

16. The flexible tubing of claim 12, wherein the tubing has a generally "D-shaped" cross-sectional profile.

17. The flexible tubing of claim 12, further comprising a plurality of secondary lumens defined by the lower portion and adapted for passing a fluid therethrough when the tubing is submerged in a body of water.

18. A flexible tubing for fine bubble aeration, comprising: an upper portion and a lower portion generally defining the tubing, the tubing having a proximal end and a distal end; an air passageway defined by the upper portion and the lower portion; a plurality of micro-slits through the upper portion and communicating with the air passageway and the outside environment; and a tether embedded in one of the upper and lower portions separate from the air passage, extending beyond at least one of the proximal and distal ends of the tubing, and adapted for securing the tubing when submerged in a body of water; wherein said lower portion has a cross-sectional shape with generally flat sidewalls and a generally flat bottom wall extending between the sidewalls.

19. The flexible tubing of claim 18, further comprising a second tether extending beyond at least one of the proximal and distal ends of the tubing, wherein said second tether is embedded in the lower portion.

20. The flexible tubing of claim 18, wherein the tubing has a generally "D-shaped" cross-sectional profile.

* * * * *